United States Patent
Iwaya et al.

(10) Patent No.: US 11,094,934 B2
(45) Date of Patent: Aug. 17, 2021

(54) ELECTRODE SLURRY, ELECTRODE AND PROCESS FOR PRODUCING THE SAME, AND SECONDARY BATTERY

(71) Applicants: Daicel Corporation, Osaka (JP); Daicel FineChem Ltd., Tokyo (JP)

(72) Inventors: Masao Iwaya, Tokyo (JP); Shinya Ono, Himeji (JP); Naoki Doi, Himeji (JP)

(73) Assignees: DAICEL CORPORATION, Osaka (JP); DAICEL FINECHEM LTD., Tokyo (JP)

( * ) Notice: Subject to any disclaimer, the term of this patent is extended or adjusted under 35 U.S.C. 154(b) by 123 days.

(21) Appl. No.: 16/474,594

(22) PCT Filed: Jan. 10, 2018

(86) PCT No.: PCT/JP2018/000336
§ 371 (c)(1),
(2) Date: Jun. 28, 2019

(87) PCT Pub. No.: WO2018/135352
PCT Pub. Date: Jul. 26, 2018

(65) Prior Publication Data
US 2021/0083275 A1    Mar. 18, 2021

(30) Foreign Application Priority Data

Jan. 17, 2017 (JP) .............................. JP2017-006167

(51) Int. Cl.
| | |
|---|---|
| H01M 4/38 | (2006.01) |
| H01M 4/04 | (2006.01) |
| H01M 4/133 | (2010.01) |
| H01M 4/134 | (2010.01) |
| H01M 4/1393 | (2010.01) |
| H01M 4/1395 | (2010.01) |
| H01M 4/66 | (2006.01) |
| H01M 10/0525 | (2010.01) |

(52) U.S. Cl.
CPC ......... *H01M 4/386* (2013.01); *H01M 4/0404* (2013.01); *H01M 4/133* (2013.01); *H01M 4/134* (2013.01); *H01M 4/1393* (2013.01); *H01M 4/1395* (2013.01); *H01M 4/661* (2013.01); *H01M 10/0525* (2013.01)

(58) Field of Classification Search
CPC .... H01M 4/386; H01M 4/0404; H01M 4/133; H01M 4/134; H01M 4/1393; H01M 4/1395
See application file for complete search history.

(56) References Cited

U.S. PATENT DOCUMENTS

| | | |
|---|---|---|
| 2009/0042100 A1 | 2/2009 | Tanaka et al. |
| 2014/0212762 A1 | 7/2014 | Nakamura et al. |
| 2014/0248537 A1 | 9/2014 | Hayashi et al. |
| 2017/0200943 A1* | 7/2017 | Kawakami .......... H01M 4/0471 |
| 2017/0338511 A1 | 11/2017 | Yamano et al. |

FOREIGN PATENT DOCUMENTS

| | | |
|---|---|---|
| CN | 103972483 A | 8/2014 |
| JP | 2008-153006 A | 7/2008 |
| JP | 2009-43641 A | 2/2009 |
| JP | 2011-90935 A | 5/2011 |
| JP | 2016-21332 A | 2/2016 |
| JP | 2016-100054 A | 5/2016 |
| WO | WO 2013/042720 A1 | 3/2013 |
| WO | WO2016010056 * | 1/2016 |

OTHER PUBLICATIONS

International Search Report, issued in PCT/JP2018/000336, PCT/ISA/210, dated Mar. 3, 2018.
Written Opinion of the International Searching Authority, issued in PCT/JP2018/000336, PCT/ISA/237, dated Mar. 3, 2018.
English translation of International Preliminary Report on Patentability and Written Opinion dated Aug. 1, 2019, in PCT/JP2018/000336 (Forms PCT/IB/338, PCT/IB/373, and PCT/ISA/237).
Extended European Search Report dated Oct. 9, 2019, in European Patent Application No. 18742137.5
Gomez Camer et al., "Nanosized Si/cellulose fiber/carbon composites as high capacity anodes for lithium-ion batteries: A Galvanostatic and dilatometric study," Electrochimica Acta (2009), vol. 54, pp. 6713-6717.
Office Action dated Jan. 27, 2021, in Taiwan Patent Application No. 107101509.

* cited by examiner

*Primary Examiner* — Olatunji A Godo
(74) *Attorney, Agent, or Firm* — Birch, Stewart, Kolasch & Birch, LLP

(57) ABSTRACT

An electrode slurry contains (A) a cellulose fiber and (C) an electrode active material, the electrode active material (C) contains at least a silicon particle and may contain a silicon particle and a carbonaceous particle. The slurry may further contain (B) a carboxymethyl-group-containing cellulose ether or a salt thereof. The average fiber length L (1 to 750 μm) of the cellulose fiber (A) is larger than the average particle size $D_{Si}$ (1 nm to 1 μm) of the silicon particle as the electrode active material (C). The average particle size ratio $L/D_{Si}$ is 5 to 15,000. The electrode slurry can improve a discharge capacity and is useful for forming an electrode of a non-aqueous secondary battery (lithium-ion secondary battery) that can maintain a high discharge capacity after repeated charging and discharging.

16 Claims, No Drawings

ELECTRODE SLURRY, ELECTRODE AND PROCESS FOR PRODUCING THE SAME, AND SECONDARY BATTERY

TECHNICAL FIELD

The present invention relates to a slurry (or slurry composition) for an electrode of a non-aqueous secondary battery such as a lithium-ion battery, an electrode for a non-aqueous secondary battery and a process for producing the same, and a non-aqueous secondary battery.

BACKGROUND ART

In recent years, non-aqueous electrolyte secondary batteries (non-aqueous secondary batteries), typified by lithium-ion batteries with a high energy density and a high capacity, have been used widely as drive power sources for mobile terminal apparatuses such as mobile phones and laptop or tablet personal computers. Further, the mobile terminal apparatuses are to make higher in performance, smaller in size, and lighter in weight. The non-aqueous secondary batteries are increasingly used for electric vehicles (EV), plug-in hybrid electric vehicles (PHEV), hybrid electric vehicles (HEV), electric tools, household electricity storage applications, storage batteries for power leveling, and other applications. The non-aqueous secondary batteries are studied to have a higher capacity, a higher output, and a longer life. Meanwhile, the upgrading of such a non-aqueous secondary battery may cause a peeling off of an electrode coating layer from a current collector in an electrode plate production step or may encounter a separation between electrode active material particles and/or a peeling off of the electrode coating layer from the current collector by expansion and contraction of an electrode due to repeated charging and discharging, thus undesirably reducing the battery characteristics. These problems require a higher adhesion between the electrode active material particles and a higher adhesion between the electrode coating layer (electrode active material layer) and the current collector.

A carbon powder, which causes no internal short circuit due to growth of electrochemically deposited dendritic lithium, is conventionally used as an electrode material of a lithium-ion battery. Reported as a carbon powder that can occlude and release lithium ions are, for example, a coke, a graphite, and a baked product of an organic matter. In particular, a lithium-ion secondary battery using a graphite particle as a negative electrode active material is widely used because of a high safety and a high capacity thereof. Many recent studies report carbon coating of a positive electrode active material for increasing the conductivity of, particularly, an olivine-type positive electrode active material.

For the formation of an electrode containing a carbon powder, in a usually employed method, a carbon powder, a binder, and an organic solvent are kneaded to give a slurry, the slurry is applied on an electrode current collector, and the applied slurry is dried for solidification to bond the carbon powder to the current collector. Thus, the binder is required for the characteristics including, for example, a mechanical strength that does not lead to breakage of the electrode even by expansion and contraction of the electrode, a binding strength for binding the carbon powders each other and binding the carbon powder and the current collector, a withstand voltage characteristic, and an appropriate viscosity for a coating ink. Commonly used as the binder are, for example, a PVDF (polyvinylidene difluoride) and a PTFE (polytetrafluoroethylene). The binder such as the PVDF needs in use to be dissolved in an organic solvent such as N-methylpyrrolidone (NMP), thus increasing the cost high and increasing adverse effects on the environment. To overcome such problems, also reported is a combination use of an aqueous dispersion of a styrene-butadiene rubber (SBR) latex instead of the PVDF-NMP-based binder as the binder and a highly hydrophilic carboxymethyl cellulose (CMC) as a thickening agent.

Incidentally, the adhesion between the negative electrode active material layer and the current collector is mainly increased by the CNC. For example, Japanese Patent Application Laid-Open Publication No. 2009-43641 (JP 2009-43641 A, Patent Document 1) discloses a negative electrode for a non-aqueous electrolyte battery; the negative electrode comprises a negative electrode active material layer, formed on a surface of a negative electrode current collector, containing a negative electrode active material and an aqueous binder for a negative electrode active material layer, wherein a porous layer containing an inorganic fine particle and a non-aqueous binder for a porous layer is formed on a surface of the negative electrode active material layer, and the binder for the negative electrode active material layer contains a CNC having a degree of etherification of not less than 0.5 and not more than 0.75. In Examples of this document, a CMC and an SER are used in combination as the binder for the negative electrode.

Unfortunately, the combination of the CMC or a salt thereof and the SBR has insufficient adhesion between the electrode active material layer and the current collector to meet the recent higher demand. Further, such a combination fails to increase a discharge capacity.

Further, a method of using a cellulose as a binder of a carbon powder that is an electrode active material of a lithium secondary battery is also studied. Japanese Patent Application Laid-Open Publication No. 2000-100439 (JP 2000-100439 A, Patent Document 2) discloses a binder containing a cellulose such as a regenerated cellulose. However, this document fails to disclose the fiber diameter or fiber length of the cellulose.

WO 2013/042720 (Patent Document 3) discloses a fine cellulose fiber as an aqueous binder for forming an electrode of a lithium secondary battery. The document also discloses that the fine cellulose fiber has a fiber diameter of 0.001 to 10 μm and an aspect ratio (L/D) of 10 to 100,000 and that the binder may further contain a water-soluble polymer, as a dispersing agent, such as a methyl cellulose, a carboxymethyl cellulose (CMC), a polyethylene glycol, or a styrene-butadiene rubber. Moreover, the document reports that Example using a lithium-titanium composite oxide (LTO) that has no or less volume change due to charging and discharging, an acetylene black, and a cellulose fiber shows a high coatability and a high charge-discharge capacity in comparison with Comparative Example 1 using a carboxymethyl cellulose instead of the cellulose fiber.

Unfortunately, for the secondary battery described in this document, it is difficult to significantly improve the discharge capacity probably because the secondary battery still has an insufficient energy density of an active material. In particular, it is difficult to improve the capacity of the battery probably because the secondary battery fails to have an increased packing density of the electrode active material.

Japanese Patent Application Laid-Open Publication No. 2016-1,00054 (JP 2016-1,00054 A, Patent Document 4) discloses a lithium secondary battery which comprises a mixed material of a silicon compound and a carbon material (a complex of pure silicon (Si), silicon monoxide (SiO), and hard carbon (HC)) as a negative electrode active material that allows a high energy density, and a polyimide resin as a binder. This document discloses that the lithium secondary battery provides an improved energy density and an improved heat resistance.

Japanese Patent Application Laid-Open Publication No. 2016-115633 (JP 2016-115633 A, Patent Document 5) discloses a negative electrode active material comprising: a silicon-containing alloy particle which has a matrix phase containing an amorphous or low-crystalline silicon as a main component and a transition-metal-silicide-containing silicide phase dispersed in the matrix phase and is represented by a predetermined composition formula; a first binder layer (a layer containing a carboxymethyl cellulose or a styrene-butadiene rubber) disposed on a surface of the alloy particle; and a second binder layer (a layer containing a polyimide) disposed on a surface of the first binder layer. This document discloses that the negative electrode active material maintains a high discharge capacity retention even when subjected to a charge-discharge cycle, and has an excellent cycle durability.

However, the secondary battery provided with the electrode described in each of these documents has a low adhesion between the current collector and the electrode due to repeated charging and discharging and fails to maintain a high discharge capacity.

As described in Patent Document 5, though use of silicon alloyable with lithium Li as the negative electrode active material improves an energy density compared with a conventional carbon-graphite-based negative electrode active material, such a use increases expansion and contraction of the negative electrode due to charging and discharging. That is, the discharge capacity and the cycle durability are in a trade-off relationship, and it is difficult to have a high discharge capacity and an improved cycle durability.

CITATION LIST

Patent Literature

Patent Document 1: JP 2009-43641 A (Claims, paragraph [0016], and Examples)
Patent Document 2: JP 2000-100439 A (claim 1 and Examples)
Patent Document 3: WO 2013/042720 (claim 1 and paragraphs [0024], [0047], and [0048])
Patent Document 4: JP 2016-1,00054 A (Claims, Effects of Invention, and Examples)
Patent Document 5: JP 2016-115633 A (Claims, [0006], [0008], Effects of Invention, and Examples)

SUMMARY OF INVENTION

Technical Problem

It is therefore an object of the present invention to provide an electrode slurry (or slurry composition) useful for forming an electrode that has an improved discharge capacity and maintains a high discharge capacity after repeated charging and discharging, an electrode prepared from the slurry, a process for producing the electrode, a non-aqueous secondary battery, and a lithium-ion secondary battery.

Another object of the present invention is to provide an electrode slurry (or slurry composition) that improves adhesion of a negative electrode active material to a current collector, an electrode, a process for producing the electrode, a non-aqueous secondary battery, and a lithium-ion secondary battery.

It is still another object of the present invention to provide an electrode slurry (or slurry composition) that has a high charge-discharge cycle durability and maintains a high adhesion of a negative electrode active material to a current collector after repeated charging and discharging even in a case where the slurry contains an electrode active material which shows large expansion and contraction due to charging and discharging, an electrode, a process for producing the electrode, a non-aqueous secondary battery, and a lithium-ion secondary battery.

Solution To Problem

The inventors of the present invention made intensive studies to achieve the above objects and finally found that, in a combination of a cellulose fiber and a silicon particle as an electrode active material, the cellulose fiber having an average fiber length larger than an average particle size of the silicon particle increases a discharge capacity, retains a high discharge capacity after repeated charging and discharging, and further increases or improves adhesion of a negative electrode active material to a current collector. The present invention was accomplished based on the above findings.

That is, the present invention includes an electrode slurry (or slurry composition) comprising (A) a cellulose fiber and (C) an electrode active material containing at least a silicon particle; the cellulose fiber (A) has an average fiber length of 1 to 750 µm, the silicon particle as the electrode active material (C) has an average particle size of 1 nm to 1 µm, and the average fiber length of the cellulose fiber (A) is larger than the average particle size of the silicon particle as the electrode active material (C).

The average fiber length of the cellulose fiber (A) may be, for example, about 2 to 100 µm. The average fiber length L of the cellulose fiber (A) may be larger than the average particle size $D_{Si}$ of the silicon particle as the electrode active material (C). For example, the ratio $L/D_{Si}$ of the average fiber length L relative to the average particle size $D_{Si}$ may be about 5 to 15,000. The cellulose fiber (A) may contain a cellulose nanofiber having a nanometer-sized average fiber diameter.

The electrode active material (C) may contain a carbonaceous particle and a silicon particle. The average particle size $D_{Si}$ of the silicon particle may be smaller than the average particle size $D_c$ of the carbonaceous particle. The ratio $Dc/D_{Si}$ of the average particle size $D_c$ of the carbonaceous particle relative to the average particle size $D_{Si}$ of the silicon particle may be about 5 to 1,000. Moreover, the ratio $L/D_c$ of the average fiber length L of the cellulose fiber (A) relative to the average particle size $D_c$ of the carbonaceous particle as the electrode active material (C) may be not less than 0.1. The electrode active material (C) may contain the carbonaceous particle and the silicon particle in a ratio of the former/the latter of 99/1 to 50/50 (weight ratio). In the slurry composition and the electrode, the electrode active material (C) may be coated or covered with (B) a carboxymethyl-group-containing cellulose ether (salt).

The electrode slurry (or slurry composition) may further contain (B) a carboxymethyl-group-containing cellulose ether or a salt thereof. The carboxymethyl-group-containing cellulose or the salt thereof (B) may contain a carboxymethyl cellulose or a salt thereof. The ratio of the cellulose fiber (A) relative to the carboxymethyl-group-containing cellulose ether or the salt thereof (B) may be about 95/5 to 20/80 in the former/the latter (weight ratio) in terms of solid content.

The total content of the cellulose fiber (A) and the carboxymethyl-group-containing cellulose ether or the salt thereof (B) may be about 1 to 5 parts by weight based on 100 parts by weight of the total amount of the component (A), the component (B), and the component (C), in terms of solid content. The amount of the carboxymethyl-group-containing cellulose ether or the salt thereof (B) may be about 0.1 to 3 parts by weight based on 100 parts by weight of the total amount of the component (A), the component (B), and the component (C), in terms of solid content.

More specifically, the electrode slurry may contain (A) a cellulose nanofiber having a nanometer-sized average fiber diameter, (B) a carboxymethyl cellulose or a salt thereof, and (C) an electrode active material containing a carbonaceous particle and a silicon particle in a ratio of the former/the latter of 98/2 to 70/30 (weight ratio). In terms of solid content, based on 100 parts by weight of the total amount of the component (A), the component (B), and the component (C), the amount of the component (A) may be about 0.1 to 3 parts by weight and the total amount of the component (A) and the component (B) may be about 1 to 4 parts by weight.

The present invention also includes a process for producing a non-aqueous secondary battery electrode, the process comprising: applying the electrode slurry (or slurry composition) on a current collector.

The present invention also includes a non-aqueous secondary battery electrode (for example, a positive electrode or negative electrode of a lithium-ion secondary battery) comprising a current collector and an electrode active material layer on at least one surface of the current collector, the electrode active material layer containing an electrode active material. The electrode active material layer contains the following component (1) or (2):

(1) the cellulose fiber (A) and the electrode active material (C) (containing at least a silicon particle)

(2) the cellulose fiber (A), the carboxymethyl-group-containing cellulose ether or the salt thereof (B), and the electrode active material (C) (containing at least a silicon particle).

The present invention includes a non-aqueous secondary battery (for example, a lithium-ion secondary battery) provided with the electrode.

In this specification, the term "electrode slurry" means a slurry for forming an electrode active material layer. The term "silicon particle" is not limited to a particle of silicon (metal) simple substance and may also include any silicon alloy particle or silicon composite particle as far as such a particle contains silicon as a main component.

Advantageous Effects Of Invention

According to the present invention, because of including the predetermined cellulose fiber and the silicon particle, a discharge capacity is significantly improved and a high discharge capacity is maintained after repeated charging and discharging. Moreover, a high adhesion to the current collector is maintained even if the electrode active material layer contains the electrode active material showing large expansion and contraction due to charging and discharging and having a high energy density.

DESCRIPTION OF EMBODIMENTS

[Electrode Slurry]

The electrode slurry of the present invention contains (A) a cellulose fiber and (C) an electrode active material and may further contain (B) a carboxymethyl-group-containing cellulose or a salt thereof [a carboxymethyl-group-containing cellulose ether (salt)].

[(A) Cellulose Fiber]

The electrode slurry of the present invention, containing the cellulose fiber, increases adhesion of the electrode active material to a current collector probably because the cellulose fiber can bond the electrode active materials by linear adhesion or linear contact (or the cellulose fiber or binder can function as a fibrous binder between adjacent electrode active materials to crosslink and bond the electrode active materials). In particular, the cellulose fiber bonds the electrode active material (C) probably in an entangled state, and this bonding prevents a silicon particle from falling off and improves adhesion to the current collector.

The cellulose fiber has an average fiber length that may be selected from a wide range of 0.1 to 1,000 μm; for example, the average fiber length may be about 1 to 750 μm (e.g., about 1.2 to 600 μm), preferably about 1.3 to 500 μm (e.g., about 1.5 to 100 μm), more preferably about 1.4 to 250 μm (e.g., about 1.6 to 50 μm), and particularly about 1.8 to 25 μm, and may usually be about 2 to 100 μm (e.g., about 3 to 50 μm, preferably about 5 to 30 μm). The cellulose fiber having too large a fiber length may fluff on a surface of an electrode and fail to improve a surface smoothness (coating uniformity) of the electrode. The cellulose fiber having too small a fiber length may fail to improve the adhesion of the electrode active material to the current collector.

The fiber length of the cellulose fiber may be uniform. The coefficient of variation of the fiber length ([standard deviation of fiber length/average fiber length]×100) may be, for example, about 0.1 to 100, preferably about 0.5 to 50, and more preferably about 1 to 30. The cellulose fiber may have a maximum fiber length of, for example, not more than 500 μm, preferably not more than 300 μm, more preferably not more than 200 μm, particularly not more than 100 μm, and usually not more than 50 μm.

It is advantageous to control the average fiber length of the cellulose fiber to 5 times or less as large as the average thickness of an electrode active material layer in view of a further improved surface smoothness (coating uniformity) and a further improved adhesion of the electrode active material to the current collector. The average fiber length of the cellulose fiber may be, for example, about 0.01 to 5 times, preferably about 0.02 to 3 times, and more preferably about 0.03 to 2 times as large as the average thickness of the electrode active material layer.

The cellulose fiber may have an average fiber diameter of, for example, about 1 nm to 10 μm (e.g., about 4 nm to 5 μm), preferably about 5 nm to 2.5 μm (e.g., about 10 nm to 1 μm), and more preferably about 20 to 700 nm (e.g., about 25 to 500 nm). The average fiber diameter may be about 30 to 200 nm (e.g., about 50 to 100 nm). In a case where the fiber diameter of the cellulose fiber is too large, the packing density of the electrode active material may be reduced due to a large occupation volume of the fiber. The cellulose fiber (A) may preferably include a cellulose nanofiber having a nanometer-sized average fiber diameter (for example, a cellulose nanofiber having an average fiber diameter of about 10 to 500 nm, preferably about 25 to 250 nm).

The fiber diameter of the cellulose fiber may also be uniform. The coefficient of variation of the fiber diameter ([standard deviation of fiber diameter/average fiber diameter]×100) may be, for example, about 1 to 80, preferably about 5 to 60, and more preferably about 10 to 50. The cellulose fiber may have a maximum fiber diameter of, for example, not more than 30 μm, preferably not more than 5 μm, and more preferably not more than 1 μm.

The ratio (aspect ratio) of the average fiber length relative to the average fiber diameter of the cellulose fiber may be, for example, about 10 to 5,000, preferably about 20 to 3,000, and more preferably about 50 to 2000 (e.g., about 100 to 1500). If the aspect ratio of the cellulose fiber is too small, the cellulose fiber may reduce the adhesion of the electrode active material to the current collector. If the aspect ratio of the cellulose fiber is too large, the cellulose fiber may decrease in the breaking strength of the fiber or may fluff on a surface of an electrode and reduce a surface smoothness (coating uniformity) of the electrode.

In the present invention, the average fiber length, the standard deviation of the fiber length distribution, the maximum fiber length, the average fiber diameter, the standard deviation of the fiber diameter distribution, and the maximum fiber diameter may be values determined from fibers (n=about 20) based on an electron micrograph.

The material of the cellulose fiber contains (or is composed of) a polysaccharide having a μ-1,4-glucan structure. The cellulose fiber may include a cellulose fiber derived from a higher plant [for example, a natural cellulose fiber (pulp fiber), such as a wood fiber (e.g., a wood pulp made from a coniferous tree or a broad-leaved tree), a bamboo fiber, a sugar cane fiber, a seed-hair fiber (e.g., a cotton linter, abombax cotton, andakapok), a bast fiber (e.g., a hemp, a kozo (a paper mulberry), and a mitsumata plant (an oriental paperbush)), or a leaf fiber (e.g., a Manila hemp and a New Zealand flax)], a cellulose fiber derived from an animal (e.g., a tunicate (or ascidian) cellulose), a cellulose fiber derived from a bacterium (e.g., a cellulose contained in nata de coco) and a chemically synthesized cellulose fiber [for example, a rayon, a cellulose ester (such as a cellulose acetate), a cellulose ether (for example, a cellulose ether derivative, e.g., a hydroxyalkl cellulose such as a hydroxyethyl cellulose (HEC) or a hydroxypropyl cellulose, and an alkyl cellulose such as a methyl cellulose or an ethyl cellulose)]. These cellulose fibers may be used alone or in combination.

Among these cellulose fibers, a preferred one includes a cellulose fiber derived from a pulp, for example, the cellulose fiber derived from the higher plant, such as a wood fiber (e.g., a wood pulp made from a coniferous tree or a broad-leaved tree) or a seed-hair fiber (e.g., a cotton linter), in view of easy preparation of a nanofiber having an appropriate aspect ratio.

The process for producing the cellulose fiber is not particularly limited to a specific one. According to desired fiber length and fiber diameter, used may be a conventional process, for example, a process described in Japanese Examined Patent Application Publication No. 60-19921 or Japanese Patent Application Laid-Open Publication No. 2011-26760, 2012-25833, 2012-36517, 2012-36518, or 2014-181421.

[(B) Carboxymethyl-group-containing Cellulose Ether or Salt Thereof (Hereinafter, which May be Referred to as Carboxymethyl-group-containing Cellulose Ether (Salt))]

In the electrode slurry of the present invention, the carboxymethyl-group-containing cellulose ether (salt) is not necessarily needed. The electrode slurry may contain the carboxymethyl-group-containing cellulose ether (salt) as a binder (or bonding agent). A combination of the cellulose fiber and the carboxymethyl-group-containing cellulose ether (salt) allows an improved coating property (coatability) (for example, easy coating) probably because of optimal modification of the viscosity of the slurry due to a thickening action of the carboxymethyl-group-containing cellulose ether (salt) and also allows an improved adhesion of the electrode active material to the current collector. Moreover, the carboxymethyl-group-containing cellulose ether (salt) allows an improved surface smoothness of a coating layer (coating uniformity) probably because the carboxymethyl-group-containing cellulose ether (salt) functions as a protective colloid to enable the electrode active material to be dispersed stably. Further, the carboxymethyl-group-containing cellulose ether (salt) also has a function of preventing or reducing decomposition of an electrolytic solution on a surface of an electrode probably because the cellulose ether (salt) covers or coats (or adheres to) the surface of the electrode.

The carboxymethyl-group-containing cellulose ether may include, for example, a carboxymethyl cellulose (CMC), an alkyl carboxymethyl cellulose (such as a methyl carboxymethyl cellulose), and a hydroxyalkyl carboxymethyl cellulose (such as a hydroxyethyl carboxymethyl cellulose or a hydroxypropyl carboxymethyl cellulose). These carboxymethyl-group-containing cellulose ethers may be used alone or in combination.

Among these carboxymethyl-group-containing cellulose ethers, the carboxymethyl cellulose (CMC) is preferred.

The CMC has any average degree of etherification (an average degree of etherification of carboxymethyl group) (or an average degree of substitution, DS) that can express an appropriate water solubility and viscosity in water to improve the coating property (coatability) of the composition. The average degree of etherification may be selected from a wide range of about 0.1 to 3 and may be preferably about 0.2 to 2, and more preferably about 0.5 to 1.2. The term "average degree of substitution" means an average of a substitution degree (a substitution rate, particularly a substitution degree of carboxymethyl groups which may form salts) with respect to hydroxyl groups on 2-, 3- and 6-positions of a glucose unit constituting a cellulose, and the maximum value of the average degree of substitution is 3.

The carboxymethyl-group-containing cellulose ether (particularly the CMC) may form a salt. The salt may include, for example, a monovalent metal salt such as an alkali metal salt (e.g., a lithium salt, a sodium salt, a potassium salt, a rubidium salt, and a cesium salt), a divalent metal salt such as an alkaline earth metal salt (e.g., a calcium salt and a magnesium salt), a quaternary ammonium salt, an amine salt, a substituted amine salt, or double salts thereof. The salt (CMC salt) preferably includes an alkali metal salt such as a sodium salt, a quaternary ammonium salt, particularly an alkali metal salt such as a sodium salt.

According to the present invention, the carboxymethyl-group-containing cellulose ether (particularly the CMC) may be in the form of a salt considering water solubility or others or may be a partial acid-type or fully acid-type CMC.

The average degree of polymerization (viscosity-average degree of polymerization) of the carboxymethyl-group-containing cellulose ether (particularly the CMC) or the salt thereof is not particularly limited to a specific one and, for example, may be about 10 to 1,000, preferably about 50 to 900, and more preferably about 100 to 800.

The ratio of the cellulose fiber (A) relative to the carboxymethyl-group-containing cellulose ether (salt) (B) may be selected from a wide range of 100/0 to 1/99, for example, 99/1 to 1/99 (e.g., 99/1 to 10/99) in the former/the latter (weight ratio) in terms of solid content; for example, the ratio may be about 95/5 to 5/95 (e.g., about 95/5 to 20/80), preferably about 90/10 to 10/90 (e.g., about 90/10 to 25/75), more preferably about 85/15 to 20/80 (e.g., about 85/15 to 30/70), particularly about 80/20 to 30/70 (e.g., about 80/20 to 33/67), and usually about 75/25 to 35/65. In a case where the ratio of the carboxymethyl-group-containing cellulose ether (salt) relative to the cellulose fiber is too low, the electrode active material may fail to be dispersed uniformly and thus the surface smoothness (coating uniformity) may fail to be improved. In a case where the ratio of the carboxymethyl-group-containing cellulose ether (salt) relative to the cellulose fiber is too high, the slurry may have a high viscosity, thus failing to improve in coating property or making the binding strength insufficient.

[(C) Electrode Active Material]

In the present invention, the electrode active material contains a silicon particle having a high energy density. Examples of the silicon particle may include an inorganic particle containing silicon as a main component (for example, not less than 35% by weight of the total, preferably not less than 50% by weight of the total, and more preferably not less than 70% by weight of the total) for example, a silicon simple substance (silicon) (a particle such as an amorphous silicon or a low-crystalline silicon), an alloy particle of silicon and a transition metal (e.g., an alloy particle such as a silicon-tin alloy SiSn, a silicon-titanium alloy SiTi, or a silicon-tin-titanium alloy (SiSnTi)), a silicon composite particle (a composite particle such as a composite particle of silicon and silicon monoxide SiO), a silicon oxide (a silicon oxide particle such as silicon monoxide SiO or silica), and a silicon carbide (SiC) particle. These silicon particles may be used alone or in combination.

A preferred silicon particle may include, for example, the silicon simple substance (silicon) particle, the alloy particle, the composite particle, the silicon monoxide SiO particle, and the silicon carbide (SIC) particle.

The silicon particle has an average particle size that may be selected from a range of, for example, about 1 nm to 5 μm (particularly about 1 nm to 1 μm). The average particle size may usually be about 2 to 700 nm (e.g., about 5 to 500 nm), preferably about 10 to 300 nm (e.g., about 20 to 200 nm), and more preferably about 25 to 150 nm (e.g., about 30 to 120 nm) or may be about 10 to 100 nm (e.g., about 40 to 80 nm). In particular, the average particle size of the silicon particle is preferably a nanometer size.

The average particle size of the silicon particle can be measured by a conventional method according to the particle size. The average particle size may be measured using a laser diffraction particle size analyzer or may be determined by analyzing an image based on an electron microscope to calculate an average particle size of 100 particles.

It is known that a silicon particle (particularly, a silicon simple substance particle) shows large volume expansion and contraction due to charging and discharging to easily separate from the current collector and to lower the durability. However, a combination of the silicon particle and the cellulose fiber (particularly, a cellulose nanofiber having a nanometer-sized average fiber diameter) can absorb the expansion and contraction of the silicon particle to retain or maintain a high adhesion to the current collector and to improve a durability to a charge-discharge cycle, probably because the cellulose fiber forms a tangled or entangled structure. In particular, it is preferred that the average fiber length L of the cellulose fiber be larger than the average particle size $D_{Si}$ of the silicon particle as the electrode active material.

The ratio $L/D_{Si}$ of the average fiber length L of the cellulose fiber (A) relative to the average particle size $D_{Si}$ of the silicon particle as the electrode active material (C) may be, for example, selected from a wide range of about not less than 5 (e.g., about 5 to 15,000, preferably about 10 to 15,000) and may usually be about 20 to 13,000 (e.g., about 30 to 12,000), preferably about 50 to 10,000 (e.g., about 75 to 7,500), and more preferably about 100 to 5,000 (e.g., about 125 to 3,000). In particular, for the silicon particle having a nanometer-sized average particle size, the ratio $L/D_{Si}$ may be, for example, about 10 to 500 (e.g., about 20 to 450), preferably about 50 to 400 (e.g., about 70 to 300), and more preferably about 80 to 200 (e.g., about 100 to 150). In a case where the average fiber length L of the cellulose fiber is excessively small, the silicon particle may easily be detached. In a case where the average fiber length L of the cellulose fiber is excessively large, the coatability or other characteristics may be reduced.

The electrode active material contains at least the silicon particle (a first active material) or may contain the first active material and a second active material in combination. Such a second active material may include, for example, a carbonaceous or carbon material (carbon), a metal simple substance, a metal silicate (such as calcium silicate, aluminum silicate, magnesium silicate, or magnesium aluminosilicate), a mineral substance (such as a zeolite, a diatomaceous earth, a baked diatomaceous earth, a talc, a kaolin, a sericite, a bentonite, a smectite, or a clay), a metal carbonate (such as magnesium carbonate, heavy calcium carbonate, or light calcium carbonate), a metal oxide (such as alumina, zinc oxide, manganese dioxide, titanium dioxide, lead dioxide, silver oxide, nickel oxide, or lithium composite oxide), a metal hydroxide (such as aluminum hydroxide, calcium hydroxide, magnesium hydroxide, nickel hydroxide, or cadmium hydroxide), and a metal sulfate (such as calcium sulfate or barium sulfate).

The carbonaceous (or carbon) material may include, for example, a natural or artificial graphite, an expandable graphite, an easily-graphitizable carbon, a hardly-graphitizable carbon, a mesocarbon microbead (MCMB), a pitch-based carbon, and a coke powder. These carbonaceous materials may be used alone or in combination. Among these carbonaceous materials, the natural or artificial graphite is preferred in view of excellent charge-discharge characteristics.

Among the metal oxides other than the silicon oxide, there may be used the lithium composite oxide, for example, $LiCo_{1-a-b-c}Ni_aMn_bAl_cO_2$ (where $0 \leq a \leq 1$, $0 \leq b \leq 1$, $0 \leq c \leq 1$, $a+b+c \leq 1$), $LiMn_2O_4$, $Li_4Ti_5O_{12}$, and $LiFePO_3$. Among these metal oxides, in view of excellent charge-discharge characteristics, a preferred one includes a lithium composite oxide such as lithium titanate ($Li_4Ti_5O_{12}$), olivine iron ($LiFePO_3$), or $LiCo_{1-a-b-c}Ni_aMn_bAl_cO_2$ (where $0 \leq a \leq 1$, $0 \leq b \leq 1$, $0 \leq c \leq 1$, $a+b+c \leq 1$).

These second electrode active materials may be used alone or in combination. Among these second active materials, the carbonaceous (or carbon) material and the metal oxide are used widely. In particular, among the second electrode active materials, the carbonaceous (or carbon) material is preferred for improving the adhesion to the current collector without lowering of the charge-discharge efficiency of the silicon particle. That is, it is preferred that the electrode active material contain the silicon particle and the carbonaceous particle. The carbonaceous (or carbon) material may form a silicon composite particle with silicon and silicon monoxide, as described in Patent Document 4.

The ratio of the second active material particle (e.g., the carbonaceous particle) relative to the silicon particle is not particularly limited to a specific one, and the former/the latter (weight ratio) may be selected from a wide range of about 99/1 to 0/100 (for example, about 98/2 to 10/90) and may usually be about 99/1 to 40/60 (e.g., about 99/1 to 50/50), preferably about 98/2 to 70/30 (e.g., about 95/5 to 75/25), and more preferably about 95/5 to 80/20 (e.g., about 93/7 to 85/15). A higher ratio of the silicon particle allows a higher discharge capacity.

The relationship between the average particle size $D_{Si}$ of the silicon particle and the average particle size of the second active material particle (for example, the carbonaceous particle) is not particularly limited to a specific one. The relationship between the above average particle sizes may be $D_{Si} \geq Dc$. In a case where the electrode active material layer is formed in the form in which the silicon particle enters a gap (or void) among the second active material particles (for example, the carbonaceous particles), the cellulose fiber prevents or absorbs expansion and contraction of the electrode active material layer due to expansion and contraction of the silicon particle, probably because the cellulose fiber linearly bonds the second active material particle (for example, the carbonaceous particle). The prevention or absorption increases the adhesion of the electrode active material layer to the current collector while retaining or maintaining a high discharge capacity. Thus, it is advantageous that the average particle size $D_{Si}$ of the silicon particle is smaller than the average particle size $D_c$ of the second active material particle (for example, the carbonaceous particle) ($D_{Si}<Dc$).

The ratio $Dc/D_{Si}$ of the average particle size $D_c$ of the second active material particle (for example, the carbonaceous particle) relative to the average particle size $D_{Si}$ of the silicon particle may be, for example, about 5 to 1,000 (e.g., about 10 to 800), preferably about 50 to 750 (e.g., about 100 to 700), and more preferably about 150 to 650 (e.g., about 200 to 600) or may be about 250 to 550 (e.g., about 300 to 500).

In the slurry composition and the electrode, the electrode active material is probably coated with the carboxymethyl-group-containing cellulose ether (salt).

Further, the ratio $L/D_c$ of the average fiber length L of the cellulose fiber (A) relative to the average particle size $D_c$ of the second electrode active material (particularly the carbonaceous material) as the electrode active material (C) may be selected from a wide range of, for example, about not less than 0.05 (e.g., about 0.07 to 1,200), preferably not less than 0.1 (e.g., about 0.1 to 1,000), and, e.g., not less than 0.12 (e.g., about 0.15 to 750), may usually be about not less than 0.15 (e.g., about 0.17 to 500), preferably about not less than 0.2 (e.g., about 0.2 to 250), more preferably about not less than 0.22 (e.g., about 0.22 to 200), and particularly about not less than 0.25 (e.g., about 0.25 to 150), or may be about not less than 0.27 (e.g., about 0.27 to 120). In particular, for the cellulose fiber (for example, a cellulose nanofiber having a nanometer-sized average fiber diameter), the ratio $L/D_c$ may be, for example, about 0.1 to 100 (e.g., about 0.12 to 50), preferably about 0.15 to 10 (e.g., about 0.17 to 5), and more preferably about 0.2 to 1 (e.g., about 0.2 to 0.5) or may be about 0.15 to 0.5 (e.g., about 0.2 to 0.4).

When one having a larger average particle size of the silicon particle and the second active material particle (for example, the carbonaceous particle) and one having a smaller average particle size of them are referred to as a first particle and a second particle, respectively, even in a case where the second particle (a small particle such as the silicon particle) enters or is filled in a gap among the first particles (for example, a large particle such as the carbonaceous particle), the cellulose fiber (A) having such an average fiber length L is entangled to linearly contact with or linearly bond to (or linearly bond and cover) the first particle. Probably due to such a linear contact or linear bonding, the cellulose fiber prevents or absorbs the expansion and contraction of the electrode active material layer while retaining or maintaining the small particle even in a case where the silicon particle largely expands or contracts. Thus, the electrode active material layer is formable on the current collector with a high adhesion. Also, in a case where the average particle size of the silicon particle and that of the second active material particle (for example, the carbonaceous particle) are substantially the same, it is presumed that the cellulose fiber bonds both particles with the same form as mentioned above.

The shape of the electrode active material particle is not particularly limited to a specific one and may be, for example, an amorphous form, a fibrous form, an ellipsoidal form, a spherical form, a plate-like form (or flat form), a flake form (or scale-like form), and a powder or particulate form. The electrode active material may usually be employed in a particulate (or particle) form.

The average particle size (D50) of the second electrode active material (particularly the carbonaceous material) measured using a laser diffraction particle size analyzer may be, for example, about 1 to 100 μm, preferably about 2 to 50 μm, more preferably about 3 to 40 μm, and particularly about 5 to 30 μm. In a case where the second electrode active material (particularly the carbonaceous material) is in a flat form or shape, the average particle size means an average diameter of the major axis and the minor axis in the plane form or shape.

[(D) Conductive Auxiliary]

(D) a conductive auxiliary is not necessarily needed. In order to improve the conductivity, the electrode active material may contain the conductive auxiliary (D) [for example, an electroconductive carbon black such as a carbon black (e.g., acetylene black, thermal black, furnace black, and Ketjen black), a carbon fiber such as a VGCF (a vapor-grown carbon fiber), a carbon nanofiber, and a carbon nanotube], a graphene, or others. These conductive auxiliaries may be used or in combination. A preferred conductive auxiliary includes acetylene black. The conductive auxiliary may be used in combination in an amount of about 0.1 to 30 parts by weight (e.g., about 0.5 to 20 parts by weight), preferably about 1 to 10 parts by weight (e.g., about 2 to 8 parts by weight) based on 100 parts by weight of the electrode active material.

[Proportion of Each Component (A), (B), (C)]

The amount of the cellulose fiber (A) based on 100 parts by weight of the electrode active material (C) may be selected from a wide range of 0.01 to 5 parts by weight in terms of solid content; and from the viewpoint of improving the adhesion of the electrode active material to the current collector, the amount may be about 0.1 to 4.5 parts by weight, preferably about 0.15 to 4 parts by weight (e.g., about 0.2 to 3.5 parts by weight), more preferably about 0.25 to 3 parts by weight (e.g., about 0.27 to 2.8 parts by weight), particularly about 0.3 to 2.5 parts by weight (e.g., about 0.4 to 2.3 parts by weight), and usually about 0.45 to 2.2 parts by weight (e.g., about 0.5 to 2 parts by weight).

The amount of the cellulose fiber (A) based on 100 parts by weight of the total amount of the cellulose fiber (A), the carboxymethyl-group-containing cellulose ether (salt) (B), and the electrode active material (C) may be selected from a wide range of about 0.01 to 5 parts by weight (e.g., about 0.1 to 4 parts by weight) in terms of solid content; and from the viewpoint of improving the adhesion of the electrode active material to the current collector, the amount may be, for example, about 0.15 to 3.5 parts by weight (e.g., about 0.2 to 3.2 parts by weight), preferably about 0.25 to 3 parts by weight (e.g., about 0.27 to 2.6 parts by weight), more preferably about 0.3 to 2.5 parts by weight (e.g., about 0.35 to 2.3 parts by weight), usually about 0.1 to 3 parts by weight (e.g., about 0.3 to 2.5 parts by weight), and preferably about 0.4 to 2.3 parts by weight (e.g., about 0.5 to 2 parts by weight).

The amount of the carboxymethyl-group-containing cellulose ether (salt) (B) based on 100 parts by weight of the electrode active material (C) may be selected from a wide range of 0 to 10 parts by weight, for example, 0.01 to 10 parts by weight (e.g., 0.05 to 5 parts by weight) in terms of solid content; and the amount may be, for example, about 0.1 to 4 parts by weight (e.g., about 0.25 to 3.5 parts by weight), preferably about 0.3 to 3 parts by weight (e.g., about 0.5 to 2.5 parts by weight), and more preferably about 0.7 to 2 parts by weight (e.g., about 0.75 to 2 parts by weight) or may usually be about 0.5 to 2.5 parts by weight (e.g., about 1 to 2 parts by weight).

The amount of the carboxymethyl-group-containing cellulose ether (salt) (B) based on 100 parts by weight of the total amount of the cellulose fiber (A), the carboxymethyl-group-containing cellulose ether (salt) (B), and the electrode active material (C) may be selected from a wide range of about 0 to 10 parts by weight, for example, about 0.01 to 10 parts by weight (e.g., about 0.05 to 4.5 parts by weight) in terms of solid content; and the amount may be, for example, about 0.1 to 4 parts by weight (e.g., about 0.1 to 3 parts by weight), preferably about 0.3 to 2.5 parts by weight (e.g., about 0.5 to 2 parts by weight), more preferably about 0.6 to 1.8 parts by weight (e.g., about 0.75 to 1.75 parts by weight), and usually about 0.5 to 2 parts by weight (e.g., about 1 to 2 parts by weight).

The total content of the cellulose fiber (A) and the carboxymethyl-group-containing cellulose ether (salt) (B) based on the 100 parts by weight of the electrode active material (C) may be selected from a range of about 0.1 to 10 parts by weight (e.g., about 0.5 to 8 parts by weight) in terms of solid content; and the total content may be, for example, about 0.5 to 7 parts by weight (e.g., about 0.8 to 6 parts by weight), preferably about 1 to 5 parts by weight (e.g., about 1 to 4.5 parts by weight), more preferably about 1.5 to 4 parts by weight (e.g., about 1.75 to 3.75 parts by weight), and usually about 1 to 5 parts by weight (e.g., about 1 to 4 parts by weight).

The total content of the cellulose fiber (A) and the carboxymethyl-group-containing cellulose ether (salt) (B) based on 100 parts by weight of the total amount of the cellulose fiber (A), the carboxymethyl-group-containing cellulose ether (salt) (B), and the electrode active material (C) may be selected from a range of about 0.1 to 10 parts by weight (e.g., about 0.5 to 7.5 parts by weight) in terms of solid content; and the total content may be, for example, about 0.5 to 6 parts by weight (e.g., about 0.7 to 5 parts by weight), preferably about 0.8 to 4.5 parts by weight (e.g., about 1 to 4.2 parts by weight), more preferably about 1 to 4 parts by weight (e.g., about 1.5 to 3.5 parts by weight and usually about 1 to 5 parts by weight (e.g., about 1 to 4.5 parts by weight).

The amount of the electrode active material (C) based on 100 parts by weight of the total amount of the cellulose fiber (A), the carboxymethyl-group-containing cellulose ether (salt) (B), and the electrode active material (C) may be selected from a range of 80 to 99.9 parts by weight (e.g., 85 to 99 parts by weight); and the amount may be, for example, about 87 to 98 parts by weight, preferably about 88 to 97 parts by weight, and more preferably about 90 to 95 parts by weight or may be about 93 to 99 parts by weight (e.g., about 95 to 99 parts by weight).

The electrode slurry of the present invention may further contain a solvent such as water (an aqueous solvent containing at least water). In the present invention, since the cellulose fiber (A) and the carboxymethyl-group-containing cellulose ether (salt) (B) have a high dispersibility or solubility in water, the electrode active material is dispersible in the aqueous solvent in a slurry form without an organic solvent. In the electrode slurry, the total content of the cellulose fiber (A), the carboxymethyl-group-containing cellulose ether (salt) (B), and the electrode active material (C) based on the whole slurry is often not more than 60% by weight (for example, 10 to 50% by weight) in terms of solid content; for example, the total content may be, for example, about 15 to 60% by weight, preferably about 20 to 55% by weight, and more preferably about 25 to 50% by weight. In a case where the solid content is too low, it may be difficult to form a thick electrode; and an excessively high solid content may reduce the coating property.

The electrode slurry may contain an organic solvent such as an aqueous organic solvent (e.g., a $C_{1-4}$alkanol such as ethanol or isopropyl alcohol). It is preferred that the electrode slurry substantially contain no organic solvent. The amount of the organic solvent based on 100 parts by weight of water may be, for example, about not more than 100 parts by weight (e.g., about 0.1 to 100 parts by weight), preferably about not more than 80 parts by weight (e.g., about 0.5 to 80 parts by weight), and more preferably about not more than 50 parts by weight (e.g., about 1 to 50 parts by weight).

Though a rubber component is not necessarily needed, the electrode slurry may further contain the rubber component. Examples of the rubber component may include a diene-series rubber, an olefin-series rubber, a polyester-series rubber, a polyamide-series rubber, a silicone-series rubber, or thermoplastic elastomers corresponding to these rubbers. These rubber components may be used alone or in combination.

Among these rubber components, the diene-series rubber (for example, a natural rubber, an isoprene rubber, a butadiene rubber, a chloroprene rubber, a styrene-diene copolymer rubber (e.g., a styrene-butadiene rubber, a styrene-chloroprene rubber, and a styrene-isoprene rubber)) is preferred. The styrene-diene copolymer rubber is more preferred. A combination of the cellulose fiber and the rubber component is advantageous in the respects that can impart a flexibility to the electrode and can prevent the electrode from breaking and separating from the current collector in winding operation of a battery cell. The amount of the rubber component (parts by weight) based on 100 parts by weight of the cellulose fiber (A) may be about 1 to 1,000 parts by weight, preferably about 5 to 500 parts by weight, and more preferably about 10 to 300 parts by weight in terms of solid content.

The electrode slurry may optionally contain a conventional additive (for example, a surfactant, a dispersing agent, a film-forming auxiliary, an antifoaming agent, a leveling agent, a flame retardant, a tackifier, a thickening agent, a heat stabilizer, and a filler). The content of these additives based on the whole solid content of the slurry may be about not more than 1% by weight (particularly about not more than 0.5% by weight).

The electrode slurry (or slurry composition) may have a viscosity (25° C., Brookfield viscometer, Rotor No. 4, 30 rpm) of, for example, about 200 to 100,000 mPa·s, preferably about 300 to 30,000 mPa·s, and more preferably about 500 to 10,000 mPa·s. The electrode slurry having too low a viscosity may make it difficult to form a thick electrode. The electrode slurry having too high a viscosity may have a reduced coating property.

The electrode slurry of the present invention can be produced by mixing the cellulose fiber (A) and the electrode active material (C), and optionally the carboxymethyl-group-containing cellulose ether (salt) (B), in an aqueous medium (for example, water). The order of mixing is not particularly limited to a specific one. Each component may be added to water at once. For example, to the aqueous medium (for example, water) may be added the cellulose fiber (A) (and optionally the carboxymethyl-group-containing cellulose ether (salt) (B)) and then added and mixed the electrode active material (C). The mixing method is not particularly limited to a specific one. There may be used a conventional stirring or mixing means (for example, a hand stirring using a stirring rod or others), a mechanical stirring means (for example, a conventional mixer such as a homomixer, a homodisper, a Henschel mixer, a banbury mixer, a ribbon mixer, a V-shaped mixer, or a planetary centrifugal mixer), and an ultrasonic disperser).

[Non-aqueous Secondary Battery Electrode]

The non-aqueous secondary battery electrode of the present invention comprises a current collector and an electrode active material layer formed on at least one surface of the current collector, and the electrode active material layer contains the cellulose fiber (A) and the electrode active material (C). The electrode active material layer may further contain the carboxymethyl-group-containing cellulose ether (salt) (B). The non-aqueous secondary battery electrode can be produced by applying the electrode slurry on the current collector and drying the applied slurry (or coating layer) to form an electrode active material layer. The electrode slurry may be applied on one surface of the current collector or may be applied on both surfaces of the current collector. As the current collector, there may be used a metal foil made of an electroconductor such as copper, aluminum, gold, silver, or stainless steel.

The amount of the electrode slurry to be applied may be, for example, about 20 to 350 g/m$^2$, preferably about 30 to 300 g/m$^2$, more preferably about 40 to 250 g/m$^2$ (e.g., about 50 to 250 g/m$^2$) in terms of solid content.

The average thickness (dry thickness) of the applied layer (the electrode active material layer) may be selected from a wide range of 2 to 500 µm; for example, the average thickness may be about not less than 5 µm (e.g., about 5 to 450 µm), preferably about not less than 10 µm (e.g., about 10 to 400 µm), more preferably about not less than 20 µm (e.g., about 20 to 300 µm), and particularly about not less than 30 µm (e.g., about 30 to 250 µm) or may be about 50 to 200 µm. In a case where the thickness is too small, the cellulose fiber may fluff on the surface of the electrode, forming a gap between the electrode and a separator and thus reducing a capacity density of a battery. Incidentally, in the present invention, the thickness of the electrode active material layer may be determined from the thickness of any position (n=about 20) measured based on an electron micrograph.

The method of applying the electrode slurry is not particularly limited to a specific one and may include a conventional method (for example, roll coating, air knife coating, blade coating, rod coating, reverse coating, bar coating, comma coating, dip and squeeze coating, die coating, gravure coating, microgravure coating, and silkscreen coating). The drying method is not particularly limited to a specific one, and may include air drying or may use hot air, far infrared radiation, microwave, or other means.

Further, in order to increase the adhesion of the electrode active material layer to the current collector, the electrode active material layer may be crimped or pressed to the current collector.

The electrode of the present invention is utilizable as an electrode (a positive electrode or negative electrode) of various non-aqueous secondary batteries. It is preferred to use the electrode as a positive electrode or negative electrode (particularly a negative electrode) of a lithium-ion battery. The lithium-ion battery can comprise, for example, a negative electrode obtained from the slurry of the present invention, a conventional positive electrode, a separator, and an electrolytic solution. The positive electrode may comprise a current collector comprising a metal foil such as aluminum, copper, gold, silver, or stainless steel, and a positive electrode active material comprising the lithium composite oxide. The separator may comprise a polyolefin-series porous film such as a polypropylene microporous film, a polyethylene microporous film, or a microporous film that is a laminate of a porous polypropylene and a porous polyethylene, a polyetherimide microporous film, a polyamideimide microporous film, or other films. Moreover, these films may have one or both surface(s) coated with an inorganic fine particle of a ceramic including alumina or magnesia or an organic matter such as aramid or PVdF, mainly in order to improve the heat resistance. The electrolytic solution may be a non-aqueous electrolytic solution having an electrolyte [e.g., a lithium salt such as $LiPF_6$, $LiClO_4$, $LiBF_4$, $LiAsF_6$, $LiCl$, $LiI$, $Li(CF_3SO_2)_2N$, or $Li(C_2F_5SO_2)_2N$] dissolved in an organic solvent (such as propylene carbonate, butylene carbonate, ethylene carbonate, diethyl carbonate, dimethyl carbonate, or ethyl methyl carbonate). The battery may be a polymer (gel polymer) lithium-ion battery having a gel electrolyte (for example, a gelled electrolyte containing a polymer such as a polyethylene oxide or a polyvinylidene difluoride in an electrolytic solution) instead of the electrolytic solution.

EXAMPLES

The following examples are intended to describe this invention in further detail and should by no means be interpreted as defining the scope of the invention.

In the following examples, "part" or "%" is by mass unless otherwise stated. The details of materials are as follows. A surface smoothness (coating uniformity) and a coating property (coatability) were evaluated on the basis of the following criteria.

Further, in preparation of a slurry in examples, a method of mixing a graphite, a silicon particle, and an acetylene black all at once is simply referred to as "at-once addition", and a method of adding and mixing a silicon particle, an acetylene black, and a graphite in a sequential order is simply referred to as "sequential addition".

[Materials]

Graphite: an artificial graphite (an average particle size of 20 µm)

Silicon particle: ("Silicon nanopowder" manufactured by Sigma-Aldrich Co. LLC, a maximum particle size of 100 nm)

AB: an acetylene black ("DENKA BLACK" manufactured by Denka Company Limited, an average particle size of 35 nm)

CMC: a carboxymethyl cellulose sodium salt ("Carboxymethyl cellulose sodium salt" manufactured by Daicel FineChem Ltd.; simply stated as carboxymethyl cellulose or CNC)

SBR: a styrene-butadiene rubber (TRD-2001 manufactured by JSR Corporation, a solid content of 48.5% by weight)

CNF: a cellulose nanofiber (prepared by the following Preparation Example 1)

Preparation Example 1

"LBKP pulp" manufactured by Hyogo Pulp Co., Ltd. was used to prepare 100 liters of a 1% by weight aqueous slurry. Then, the slurry was beat 10 times using a disc refiner ("SUPERFIBRATER 400-TFS" manufactured by HASEGAWA REFRIGERATION, LTD.) at a clearance of 0.15 mm and a disc rotational speed of 1750 rpm to give a refined product. The refined product was processed 50 times at a processing pressure of 50 MPa using a homogenizer ("15M8AT" manufactured by Gaulin) equipped with a crushing-type homovalve sheet. The resulting microfibrillared fiber was observed using a transmission electron microscope (TEM), 10 fibers were chosen at random, and the fiber length and the fiber diameter were measured for the chosen fibers. The 10 fibers had an average fiber diameter of 79.2 nm, an average fiber length of 6.14 μm, and an aspect ratio (average fiber length/average fiber diameter) of 78. The resulting 1% by weight aqueous slurry was filtered through gauze repeatedly to give a slurry having a solid concentration of 9.9% by weight. This slurry was referred to as "CNF slurry", and the cellulose fiber in the "CNF slurry" was referred to as "CNF".

[Adhesion]

Using each of negative electrode plates produced in the following Examples and Comparative Examples, a peel strength between a copper foil as a current collector and a negative electrode coating layer was measured in accordance with Japanese Industrial Standard (JIS) K6854-1. The test sample had a width of 25 mm and a length of 90 mm at which the copper foil adhered to the negative electrode coating layer. In a peel test, a non-adhesion end of the copper foil (a portion having no adhesion to the negative electrode coating layer) was pulled to determine a peel strength.

[Charge-discharge Test]

A theoretical capacity (mAh) was calculated based on the contents of graphite and silicon as an electrode active material contained in a prepared battery. The calculated theoretical capacity was divided by "5" to obtain an amperage (theoretical capacity/5 (mA), hereinafter referred to as 0.2 C). A charging process was started at this amperage and was performed at a constant current until the negative electrode voltage reached 1 mV versus lithium. After the voltage reached 1 mV, the charging process was continued in a constant voltage mode. At the time when the charging current reached one-fourth as large as the original charging current (0.05 C), the charging process was terminated and was switched to a discharging process. The discharging process was performed at a constant current of 0.2 C. At the time when the negative electrode voltage reached 2.0 V versus lithium, the discharging process was terminated. This charge-discharge cycle was defined as one cycle, and 20 cycles were carried out.

The ratio of the discharge capacity of the first cycle relative to the discharge capacity of the 20th cycle in this cycle test was referred to as a discharge capacity retention.

Example 1

Using a planetary mixer, 2.0 g of "CNF slurry" and 4.0 g of water were stirred and mixed at 2000 rpm for 2 minutes. To this slurry mixture was added 6.0 g of water, and the resulting mixture was stirred and mixed at 2000 rpm for 2 minutes, and then 0.15 g of CMC powder was added thereto; and stirring and mixing at 2000 rpm for 2 minutes was repeated 5 times. To the prepared mixture were added 8.1 g of graphite, 0.9 g of silicon particle, 0.6 g of acetylene black all at once; and stirring and mixing at 2000 rpm for 2 minutes was repeated 3 times (at-once addition). To the resulting mixture was added water divided in three portions, 5.0 g, 6.0 g, and 5.0 g, in a manner that the mixture was stirred and mixed at 2000 rpm for 2 minutes after each addition of water portions. Finally, 0.1 g of an aqueous dispersion of SER having a solid concentration of 48.5% by weight was added thereto, and the resulting mixture was stirred and mixed at 2000 rpm for 2 minutes.

The resulting slurry having a solid concentration 27.6% by weight was applied on a copper foil having a thickness of 14 μm using an applicator, was dried using a hot plate at 60° C. for 10 minutes, and was then rolled by roll pressing, and was then punched in a circular form having a diameter of 17 mm. The circular sample was dried in a vacuum dryer at 120° C. for 10 hours to form an electrode (basis weight: 5.6 g/cm$^2$, electrode thickness: 37 μm, electrode density: 1.52 g/cm$^3$). The resulting electrode was referred to as "Electrode 1".

Example 2

Mixed were 0.6 g of silicon particle and 2.0 g of a 1.0% by weight aqueous solution of carboxymethyl cellulose; and stirring and mixing at 2000 rpm for 2 minutes using a planetary mixer was repeated 5 times. Thereafter, 0.4 g of acetylene black and 1.6 g of a 1.0% by weight aqueous solution of CMC were added thereto; and stirring and mixing at 2000 rpm for 2 minutes was repeated 5 times. To the resulting mixture were added 5.4 g of graphite, 1.3 g of a 1.0% by weight aqueous solution of CMC, and 1.35 g of "CNF slurry"; and stirring and mixing at 2000 rpm for 2 minutes was repeated 3 times (sequential addition). Further, 3.0 g of a 1.0% by weight aqueous solution of CMC was added and was stirred and mixed at 2000 rpm for 2 minutes, and then 2.8 g of a 1.0% by weight aqueous solution of CMC was added and was stirred and mixed at 2000 rpm for 2 minutes. To the prepared mixture was added 5.0 g of water and was stirred and mixed at 2000 rpm for 2 minutes and then further added 2.0 g of water and was stirred and mixed at 2000 rpm for 2 minutes. Finally, 0.07 g of an aqueous dispersion of SBR having a solid concentration of 48.5% by weight was added thereto, and the resulting mixture was stirred and mixed at 2000 rpm for 2 minutes.

In the same manner as Example 1 except that the resulting slurry having a solid concentration of 26.0% by weight was used, an electrode (basis weight: 5.4 g/cm$^2$, electrode thickness: 38 μm, electrode density: 1.43 g/cm$^3$) having a copper foil with a thickness of 14 μm was formed. The resulting electrode was referred to as "Electrode 2".

Comparative Example 1

Using a planetary mixer, 0.15 g of CMC powder, 8.1 g of graphite, 0.9 g of silicon particle, 0.6 g of acetylene black, and 6.0 g of water were stirred and mixed at 2000 rpm for 2 minutes (at-once addition). To the mixture was added 4.0 g of water; and stirring and mixing at 2000 rpm for 2 minutes was repeated 3 times. Thereafter, to the resulting mixture was added 3.0 g of water twice, in a manner that the mixture was stirred and mixed at 2000 rpm for 2 minutes after each water addition. Finally, 0.11 g of an aqueous dispersion of SBR having a solid concentration of 48.5% by weight was added thereto, and the resulting mixture was stirred and mixed at 2000 rpm for 2 minutes.

In the same manner as Example 1 except that the resulting slurry having a solid concentration of 35.9% by weight was used, an electrode (basis weight: 5.5 g/cm$^2$, electrode thickness: 37 μm, electrode density: 1.49 g/cm$^3$) having a copper foil with a thickness of 14 μm was formed. The resulting electrode was referred to as "Electrode 3".

Comparative Example 2

Mixed were 0.6 g of silicon particle and 1.3 g of a 1.0% by weight aqueous solution of CMC; and stirring and mixing at 2000 rpm for 2 minutes using a planetary mixer was repeated 5 times. To the mixture were added 0.4 g of acetylene black and 1.6 g of a 1.0% by weight aqueous solution of CMC; and stirring and mixing at 2000 rpm for 2 minutes was repeated 5 times. Thereafter, 5.4 g of graphite and 2.7 g of a 1.0% by weight aqueous solution of CMC were further added thereto; and stirring and mixing at 2000 rpm for 2 minutes was repeated 3 times (sequential addition). Further, 2.1 g of a 1.0% by weight aqueous solution of CMC was added and was stirred and mixed at 2000 rpm for 2 minutes, and then 2.3 g of a 1.0% by weight aqueous solution of CMC was added and was stirred and mixed at 2000 rpm for 2 minutes. Finally, 0.35 g of an aqueous dispersion of SBR having a solid concentration of 48.5% by weight was added thereto, and the resulting mixture was stirred and mixed at 2000 rpm for 2 minutes.

In the same manner as Example 1 except that the resulting slurry having a solid concentration of 39.8% by weight was used, an electrode (basis weight: 5.4 g/cm$^2$, electrode thickness: 39 μm, electrode density: 1.39 g/cm$^3$) having a copper foil with a thickness of 14 μm was formed. The resulting electrode was referred to as "Electrode 4".

Example 3

Using a planetary mixer, 1.0 g of "CNF slurry" and 2.0 g of water were stirred and mixed at 2000 rpm for 2 minutes. Then, to the mixture was added 3.0 g of water, and the resulting mixture was stirred and mixed at 2000 rpm for 2 minutes. To the resulting mixture was added 0.15 g of CMC powder; and stirring and mixing at 2000 rpm for 2 minutes was repeated 5 times. Thereafter, to the resulting mixture were added 8.1 g of graphite, 0.9 g of silicon particle, and 0.6 g of acetylene black; and stirring and mixing at 2000 rpm for 2 minutes was repeated 3 times (at-once addition). To the resulting mixture was added water divided in three portions, 3.0 g, 10.0 g, and 3.0 g, in a manner that the mixture was stirred and mixed at 2000 rpm for 2 minutes after each addition of water portions. Finally, 0.31 g of an aqueous dispersion of SER having a solid concentration of 48.5% by weight was added thereto, and the resulting mixture was stirred and mixed at 2000 rpm for 2 minutes.

In the same manner as Example 1 except that the resulting slurry having a solid concentration of 31.2% by weight was used, an electrode (basis weight: 5.7 g/cm$^2$, electrode thickness: 40 μm, electrode density: 1.42 g/cm$^3$) having a copper foil with a thickness of 14 μm was formed. The resulting electrode was referred to as "Electrode 5".

Example 4

Using a planetary mixer, 0.51 g of "CNF slurry" and 1.0 g of water were stirred and mixed at 2000 rpm for 2 minutes. Then, to the mixture was added 1.5 g of water and the resulting mixture was stirred and mixed at 2000 rpm for 2 minutes. To the resulting mixture was added 0.15 g of CMC powder; and stirring and mixing at 2000 rpm for 2 minutes was repeated 5 times. To the resulting mixture were added 8.1 g of graphite, 0.9 g of silicon particle, and 0.6 g of acetylene black; and stirring and mixing at 2000 rpm for 2 minutes was repeated 3 times (at-once addition). To the resulting mixture was added water divided in two portions, 5.0 g and 10.0 g, in a manner that the mixture was stirred and mixed at 2000 rpm for 2 minutes after each addition of water portions. Finally, 0.41 g of an aqueous dispersion of SBR having a solid concentration of 48.5% by weight was added thereto, and the resulting mixture was stirred and mixed at 2000 rpm for 2 minutes.

In the same manner as Example 1 except that the resulting slurry having a solid concentration of 35.5% by weight was used, an electrode (basis weight: 5.7 g/cm$^2$, electrode thickness: 40 μm, electrode density: 1.42 g/cm$^3$) having a copper foil with a thickness of 14 μm was formed. The resulting electrode was referred to as "Electrode 6".

Example 5

Using a planetary mixer, 2.02 g of "CNF slurry" and 4.0 g of water were stirred and mixed at 2000 rpm for 2 minutes. Then, to the mixture was added 6.0 g of water, and the resulting mixture was stirred and mixed at 2000 rpm for 2 minutes. To the resulting mixture was added 0.15 g of CMC powder; and stirring and mixing at 2000 rpm for 2 minutes was repeated 5 times. Thereafter, to the resulting mixture were added 8.28 g of graphite, 0.72 g of silicon particle, and 0.6 g of acetylene black; and stirring and mixing at 2000 rpm for 2 minutes was repeated 3 times (at-once addition). To the resulting mixture was added water divided in three portions, 5.0 g, 10.0 g, and 5.0 g, in a manner that the mixture was stirred and mixed at 2000 rpm for 2 minutes after each addition of water portions. Finally, 0.103 g of an aqueous dispersion of SBR having a solid concentration of 48.5% by weight was added thereto, and the resulting mixture was stirred and mixed at 2000 rpm for 2 minutes.

In the same manner as Example 1 except that the resulting slurry having a solid concentration of 23.9% by weight was used, an electrode (basis weight: 6.0 g/cm$^2$, electrode thickness: 43 electrode density: 1.39 g/cm$^3$) having a copper foil with a thickness of 14 μm was formed. The resulting electrode was referred to as "Electrode 7".

Example 6

Mixed were 0.74 g of silicon particle and 2.0 g of a 1.0% by weight aqueous solution of CMC; and stirring and mixing at 2000 rpm for 2 minutes using a planetary mixer was repeated 5 times. Thereafter, 0.4 g of acetylene black and 1.5 g of a 1.0% by weight aqueous solution of CMC were added thereto; and stirring and mixing at 2000 rpm for 2 minutes was repeated 5 times. To the resulting mixture were added 8.5 g of graphite, 2.0 g of a 1.0% by weight aqueous solution of CMC, and 2.0 g of "CNF slurry"; and stirring and mixing at 2000 rpm for 2 minutes was repeated 3 times (sequential addition). To the resulting mixture was added 4.5 g of a 1.0% by weight aqueous solution of CMC, and the resulting mixture was stirred and mixed at 2000 rpm for 2 minutes. Further, 5.0 g of a 1.0% by weight aqueous solution of CMC was added and was stirred and mixed at 2000 rpm for 2 minutes, and then 10.0 g of water was added and stirred and mixed at 2000 rpm for 2 minutes. Further, 3.0 g of water was added and stirred and mixed at 2000 rpm for 2 minutes. Finally, 0.11 g of an aqueous dispersion of SBR having a solid concentration of 48.5% by weight was added thereto, and the resulting mixture was stirred and mixed at 2000 rpm for 2 minutes.

In the same manner as Example 1 except that the resulting slurry having a solid concentration of 25.2% by weight was used, an electrode (basis weight: 5.5 g/cm², electrode thickness: 38 μm, electrode density: 1.44 g/cm³) having a copper foil with a thickness of 14 μm was formed. The resulting electrode was referred to as "Electrode 8".

Comparative Example 3

Mixed were 0.74 g of silicon particle and 2.0 g of a 1.0% by weight aqueous solution of CMC; and stirring and mixing at 2000 rpm for 2 minutes using a planetary mixer was repeated 5 times. To the mixture were added 0.4 g of acetylene black and 1.5 g of a 1.0% by weight aqueous solution of CMC; and stirring and mixing at 2000 rpm for 2 minutes was repeated 5 times. Thereafter, 8.5 g of graphite and 4.0 g of a 1.0% by weight aqueous solution of CMC were added thereto; and stirring and mixing at 2000 rpm for 2 minutes was repeated 3 times (sequential addition). Further, 3.5 g of a 1.0% by weight aqueous solution of CMC was added and was stirred and mixed at 2000 rpm for 2 minutes, and then 4.0 g of a 1.0% by weight aqueous solution of CMC was added and was stirred and mixed at 2000 rpm for 2 minutes. Finally, 0.52 g of an aqueous dispersion of SBR having a solid concentration of 48.5% by weight was added and was stirred and mixed at 2000 rpm for 2 minutes.

In the same manner as Example 1 except that the resulting slurry having a solid concentration of 39.8% by weight was used, an electrode (basis weight: 5.5 g/cm², electrode thickness: 39 μm, electrode density: 1.40 g/cm³) having a copper foil with a thickness of 14 μm was formed. The resulting electrode was referred to as "Electrode 9".

Table 1 shows each composition of electrodes prepared in Examples and Comparative Examples.

(Peel Strength)

For "Electrode 5" obtained in Example 3, "Electrode 6" obtained in Example 4, and "Electrode 3" obtained in Comparative Example 1, the peel strength was measured. The results are shown in Table 2.

TABLE 2

|  | Electrode No. | CNF concentration (% by weight) | Peel strength (N/m) |
| --- | --- | --- | --- |
| Example 3 | 5 | 1.0 | 3.8 |
| Example 4 | 6 | 0.5 | 3.3 |
| Comparative Example 1 | 3 | 0 | 2.7 |

The comparison of Examples 3 and 4 with Comparative Example 1 clearly shows that a higher CNF concentration improves the peel strength.

Example 7

A polyethylene microporous film and a glass nonwoven fabric as separators were placed between "Electrode 1" produced in Example 1 and a lithium metal foil punched in the same size as "Electrode 1", and an electrolytic solution was introduced between "Electrode 1" and the lithium metal foil. The resulting battery element was crimped at a pressure of 2 kg/cm² from the lithium foil side to give a coin battery ("Battery 1"). As the electrolytic solution was used a solution obtained as follows. To a mixture having ethylene carbonate and ethyl methyl carbonate in a volume ratio of 3:7 were added 10% by volume each of vinylene carbonate and fluoroethylene carbonate, and in the resulting solvent system was dissolved $LiPF_6$ at a concentration of 1 M to give a solution.

Example 8

In the same manner as Example 7 except that the battery element was crimped at a pressure of 9 kg/cm² from the lithium foil side, a coin battery ("Battery 2") was produced.

TABLE 1

|  | Electrode No. | Graphite/Si ratio in active material | Addition method | Composition of electrode (% by weight) | | | | |
| --- | --- | --- | --- | --- | --- | --- | --- | --- |
|  |  |  |  | Active material | AB | CMC | CNF | SBR |
| Example 1 | Electrode 1 | 90/10 | At-once addition | 90% | 6% | 1.5% | 2% | 0.5% |
| Example 2 | Electrode 2 | 90/10 | Sequential addition | 90% | 6% | 1.5% | 2% | 0.5% |
| Example 3 | Electrode 5 | 90/10 | At-once addition | 90% | 6% | 1.5% | 1% | 1.5% |
| Example 4 | Electrode 6 | 90/10 | At-once addition | 90% | 6% | 1.5% | 0.5% | 2% |
| Example 5 | Electrode 7 | 92/8 | At-once addition | 90% | 6% | 1.5% | 2% | 0.5% |
| Example 6 | Electrode 8 | 92/8 | Sequential addition | 92% | 4% | 1.5% | 2% | 0.5% |
| Comparative Example 1 | Electrode 3 | 90/10 | At-once addition | 90% | 6% | 1.5% | 0% | 2.5% |
| Comparative Example 2 | Electrode 4 | 90/10 | Sequential addition | 90% | 6% | 1.5% | 0% | 2.5% |
| Comparative Example 3 | Electrode 9 | 92/8 | Sequential addition | 92% | 4% | 1.5% | 0% | 2.5% |

Example 9

In the same manner as Example 7 except that "Electrode 2" produced in Example 2 was used instead of "Electrode 1" produced in Example 1, a coin battery ("Battery 3") was produced.

Example 10

In the same manner as Example 7 except that "Electrode 5" produced in Example 3 was used instead of "Electrode 1" produced in Example 1, a coin battery ("Battery 4") was produced.

Example 11

In the same manner as Example 7 except that "Electrode 6" produced in Example 4 was used instead of "Electrode 1" produced in Example 1, a coin battery ("Battery 5") was produced.

Example 12

In the same manner as Example 7 except that "Electrode 7" produced in Example 5 was used instead of "Electrode 1" produced in Example 1, a coin battery ("Battery 6") was produced.

Example 13

In the same manner as Example 7 except that "Electrode 8" produced in Example 6 was used instead of "Electrode 1" produced in Example 1, a coin battery ("Battery 7") was produced.

Comparative Example 4

In the same manner as Example 7 except that "Electrode 3" produced in Comparative Example 1 was used instead of "Electrode 1" produced in Example 1, a coin battery ("Battery 8") was produced.

Comparative Example 5

In the same manner as Example 7 except that "Electrode 3" produced in Comparative Example 1 was used instead of "Electrode 1" produced in Example 1 and that the battery element was crimped at a pressure of 9 kg/cm$^2$ from the lithium foil side, a coin battery ("Battery 9") was produced.

Comparative Example 6

In the same manner as Example 7 except that "Electrode 4" produced in Comparative Example 2 was used instead of "Electrode 1" produced in Example 1, a coin battery ("Battery 10") was produced.

Comparative Example 7

In the same manner as Example 7 except that "Electrode 9" produced in Comparative Example 3 was used instead of "Electrode 1" produced in Example 1, a coin battery ("Battery 11") was produced.

For "Battery 1" to "Battery 11" obtained in Examples 7 to 13 and Comparative Examples 4 to 7, the charge-discharge test was performed. The results are shown in Table 3.

TABLE 3

| Examples | Electrode No. | Graphite/Si ratio | Addition method | CNF | Pressing pressure kgf/cm$^2$ | Battery | Discharge capacity (mAh) 1st cycle | 20th cycle | Discharge capacity retention % |
|---|---|---|---|---|---|---|---|---|---|
| Example 7 | Electrode 1 | 90/10 | At-once addition | 2% | 2 | 1 | 511 | 441 | 86.3 |
| Example 8 | Electrode 1 | 90/10 | At-once addition | 2% | 9 | 2 | 516 | 427 | 82.7 |
| Example 9 | Electrode 2 | 90/10 | Sequential addition | 2% | 2 | 3 | 543 | 449 | 82.8 |
| Example 10 | Electrode 5 | 90/10 | At-once addition | 1% | 2 | 4 | 462 | 363 | 78.6 |
| Example 11 | Electrode 6 | 90/10 | At-once addition | 0.5% | 2 | 5 | 471 | 389 | 82.6 |
| Example 12 | Electrode 7 | 92/8 | At-once addition | 2% | 2 | 6 | 486 | 428 | 88.1 |
| Example 13 | Electrode 8 | 92/8 | Sequential addition | 2% | 2 | 7 | 482 | 408 | 84.6 |
| Comparative Example 4 | Electrode 3 | 90/10 | At-once addition | 0% | 2 | 8 | 479 | 345 | 72.1 |
| Comparative Example 5 | Electrode 3 | 90/10 | At-once addition | 0% | 9 | 9 | 496 | 397 | 80.1 |
| Comparative Example 6 | Electrode 4 | 90/10 | Sequential addition | 0% | 2 | 10 | 518 | 404 | 78.0 |
| Comparative Example 7 | Electrode 9 | 92/8 | Sequential addition | 0% | 2 | 11 | 466 | 372 | 79.9 |

As apparent from the above Table 3, in the batteries of Examples 7, 10, and 11 and Comparative Example 4, the electrode material was prepared by the same addition method (at-once addition) at a composition of graphite/Si of 90/10 (weight ratio), and the electrode was prepared by crimping at a pressing pressure of 2 kgf/cm². Example 11, in which the addition amount of CNF was only 0.5%, as well as Example 7, in which the addition amount of CNF was 2.0%, has a high discharge capacity and a discharge capacity retention at the 20th cycle. The batteries using CNF as a binder show more preferred characteristics.

Moreover, from the comparison of Comparative Example 4 with Comparative Example 5, a higher pressing pressure of 9 kgf/cm² probably allows prevention of the electrode from separating, and thus a higher pressing pressure shows higher battery characteristics. As apparent from the comparison of Example 8 with Comparative Example 5, even for the examples in which the pressing pressure was increased, the battery using CNF as a binder shows preferred characteristics including both discharge capacity and discharge capacity retention at the 20th cycle.

Further, in the batteries of Example 9 and Comparative Example 6, the electrode material was prepared by the same addition method (sequential addition) at a composition of graphite/Si of 90/10 (weight ratio), and the electrode was prepared by crimping at a pressing pressure of 2 kgf/cm². From these examples, the battery using CNF as a binder shows preferred characteristics including both discharge capacity and discharge capacity retention at the 20th cycle.

Furthermore, in the batteries of Examples 12 and 13 and Comparative Example 7, the electrode material was prepared at a composition of graphite/Si of 92/8 (weight ratio). From these examples, the batteries using CNF as a binder show preferred characteristics including both discharge capacity and discharge capacity retention at the 20th cycle.

INDUSTRIAL APPLICABILITY

The electrode slurry of the present invention is suitably used for an electrode of a non-aqueous secondary battery such as a lithium-ion battery or a polymer lithium-ion battery. In particular, the lithium-ion battery provided with the electrode obtained from the electrode slurry of the present invention has a high adhesion between the electrode active material layer and the current collector and a high charge-discharge capacity, and is thus utilizable in various fields including electric equipment (particularly, mobile equipment such as mobile phone equipment or portable equipment), electric vehicles, and hybrid electric vehicles (REV).

The invention claimed is:

1. An electrode slurry comprising:
(A) a cellulose fiber and (C) an electrode active material consisting essentially of a carbonaceous particle and a silicon particle in a ratio of the former/the latter of 99/1 to 50/50 (weight ratio),
the cellulose fiber (A) having an average fiber length of 1 to 750 μm,
the silicon particle as the electrode active material (C) having an average particle size of 1 nm to 1 μm, and
the average fiber length of the cellulose fiber (A) being larger than the average particle size of the silicon particle as the electrode active material (C),
wherein a ratio $L/D_{Si}$ is 20 to 15,000, where L represents the average fiber length of the cellulose fiber (A), and $D_{Si}$ represents the average particle size of the silicon particle as the electrode active material (C).

2. The electrode slurry according to claim 1, wherein the cellulose fiber (A) contains a cellulose nanofiber having a nanometer-sized average fiber diameter.

3. The electrode slurry according to claim 1, wherein the average particle size of the silicon particle is smaller than an average particle size of the carbonaceous particle.

4. The electrode slurry according to claim 1, wherein
a ratio $D_c/D_{Si}$ is 5 to 1,000, where $D_c$ represents an average particle size of the carbonaceous particle, and $D_{Si}$ represents the average particle size of the silicon particle, and
a ratio $L/D_c$ is not less than 0.1, where L represents the average fiber length of the cellulose fiber (A), and $D_c$ represents the average particle size of the carbonaceous particle as the electrode active material (C).

5. The electrode slurry according to claim 1, which further contains (B) a carboxymethyl-group-containing cellulose ether or a salt thereof.

6. The electrode slurry according to claim 1, which further contains (B) a carboxymethyl-group-containing cellulose ether or a salt thereof, wherein
the cellulose fiber (A) contains a cellulose nanofiber having an average fiber length of 2 to 100 μm,
the carboxymethyl-group-containing cellulose or the salt thereof (B) contains a carboxymethyl cellulose or a salt thereof, and
a ratio of the cellulose fiber (A) relative to the carboxymethyl-group-containing cellulose ether or the salt thereof (B) is 95/5 to 20/80 in the former/the latter (weight ratio) in terms of solid content.

7. The electrode slurry according to claim 1, which further contains (B) a carboxymethyl-group-containing cellulose ether or a salt thereof, wherein, in terms of solid content, a total content of the cellulose fiber (A) and the carboxymethyl-group-containing cellulose ether or the salt thereof (B) is 1 to 5 parts by weight based on 100 parts by weight of a total amount of the cellulose fiber (A), the carboxymethyl-group-containing cellulose ether or the salt thereof (B), and the electrode active material (C).

8. The electrode slurry according to claim 5, wherein, in terms of solid content, an amount of the carboxymethyl-group-containing cellulose ether or the salt thereof (B) is 0.1 to 3 parts by weight based on 100 parts by weight of a total amount of the cellulose fiber (A), the carboxymethyl-group-containing cellulose ether or the salt thereof (B), and the electrode active material (C).

9. The electrode slurry according to claim 1, which further contains a carboxymethyl cellulose or a salt thereof (B), wherein
the cellulose fiber (A) comprises a cellulose nanofiber having a nanometer-sized average fiber diameter,
the electrode active material (C) consists essentially of the carbonaceous particle and the silicon particle in a ratio of the former/the latter of 98/2 to 70/30 (weight ratio), and
in terms of solid content, an amount of the component (A) is 0.1 to 3 parts by weight and a total amount of the component (A) and the component (B) is 1 to 4 parts by weight based on 100 parts by weight of a total amount of the component (A), the component (B), and the component (C).

10. A non-aqueous secondary battery electrode comprising a current collector and an electrode active material layer on at least one surface of the current collector, the electrode active material layer containing an electrode active material, wherein the electrode active material layer contains (A) a cellulose fiber and (C) an electrode active material recited in claim 1.

11. The electrode according to claim 10, which is a positive electrode or a negative electrode of a lithium-ion secondary battery.

12. A non-aqueous secondary battery provided with an electrode recited in claim 10.

13. The electrode slurry according to claim 1, which further contains (B) a carboxymethyl-group-containing cellulose ether or a salt thereof, wherein
   the cellulose fiber (A) contains a cellulose nanofiber having an average fiber length of 2 to 100 μm,
   the carboxymethyl-group-containing cellulose or the salt thereof (B) contains a carboxymethyl cellulose or a salt thereof, and
   a ratio of the cellulose fiber (A) relative to the carboxymethyl-group-containing cellulose ether or the salt thereof (B) is 85/15 to 20/80 in the former/the latter (weight ratio) in terms of solid content.

14. A non-aqueous secondary battery electrode comprising a current collector and an electrode active material layer on at least one surface of the current collector, the electrode active material layer containing an electrode active material, wherein the electrode active material layer contains (A) a cellulose fiber, (B) a carboxymethyl-group-containing cellulose ether or a salt thereof, and (C) an electrode active material recited in claim 5.

15. The electrode according to claim 14, which is a positive electrode or a negative electrode of a lithium-ion secondary battery.

16. A non-aqueous secondary battery provided with an electrode recited in claim 14.

\* \* \* \* \*